UNIVERSAL TV FIELD SELECTION AND METHOD

Filed June 15, 1967 4 Sheets-Sheet 1

INVENTOR
RALPH R. REISER
BY A. C. Smith
ATTORNEY

UNIVERSAL TV FIELD SELECTION AND METHOD.

Filed June 15, 1967 4 Sheets-Sheet 2

INVENTOR
RALPH R. REISER

BY A. C. Smith

ATTORNEY

UNIVERSAL TV FIELD SELECTION AND METHOD

Filed June 15, 1967 4 Sheets-Sheet 3

INVENTOR
RALPH R. REISER
BY A. C. Smith
ATTORNEY

UNIVERSAL TV FIELD SELECTION AND METHOD

Filed June 15, 1967 4 Sheets-Sheet 4

INVENTOR
RALPH R. REISER
BY R. C. Smith
ATTORNEY

United States Patent Office 3,485,950

Patented Dec. 23, 1969

3,485,950

UNIVERSAL TV FIELD SELECTION AND METHOD

Ralph R. Reiser, Colorado Springs, Colo., assignor to Hewlett-Packard Company, Palo Alto, Calif., a corporation of California Filed June 15, 1967, Ser. No. 646,376
Int. Cl. H04l 7/04
U.S. Cl. 178—69.5 3 Claims

ABSTRACT OF THE DISCLOSURE

A TV field selection circuit operates on universally known television systems to select the first vertical serrated pulse by its position with respect to the horizontal pulses.

BACKGROUND OF THE INVENTION

Certain known TV field selection circuits are designed to operate specifically on the 525-line standard TV system used in the United States. These circuits are useful for selecting one of the two television field signals for display on an oscilloscope when it is desirable to analyze the television signal under test. Circuits of this type are described in pending U.S. patent application Ser. No. 452,659, filed on May 3, 1965, by Richard E. Monnier, now U.S. Patent No. 3,424,867. One disadvantage encountered with these circuits is that the oscilloscope sweep to display a TV field signal must be initiated before determination can be made of the particular TV field signal being displayed. If the TV field signal is other than the one selected, the oscilloscope sweep is reset and initiated on the selected field signal. However, where low level or noisy signals are being examined, improper triggering may recur frequently, producing an objectionable jittery and intensified trace in the left portion of the displayed field signals.

SUMMARY OF THE INVENTION

Accordingly, it is an object of the present invention to provide a TV field signal selection circuit and method which is operable on all commercially known television systems and which initiates a display of the selected field signal only after it has been properly identified.

DESCRIPTION OF THE PREFERRED EMBODIMENTS

Figure 1:
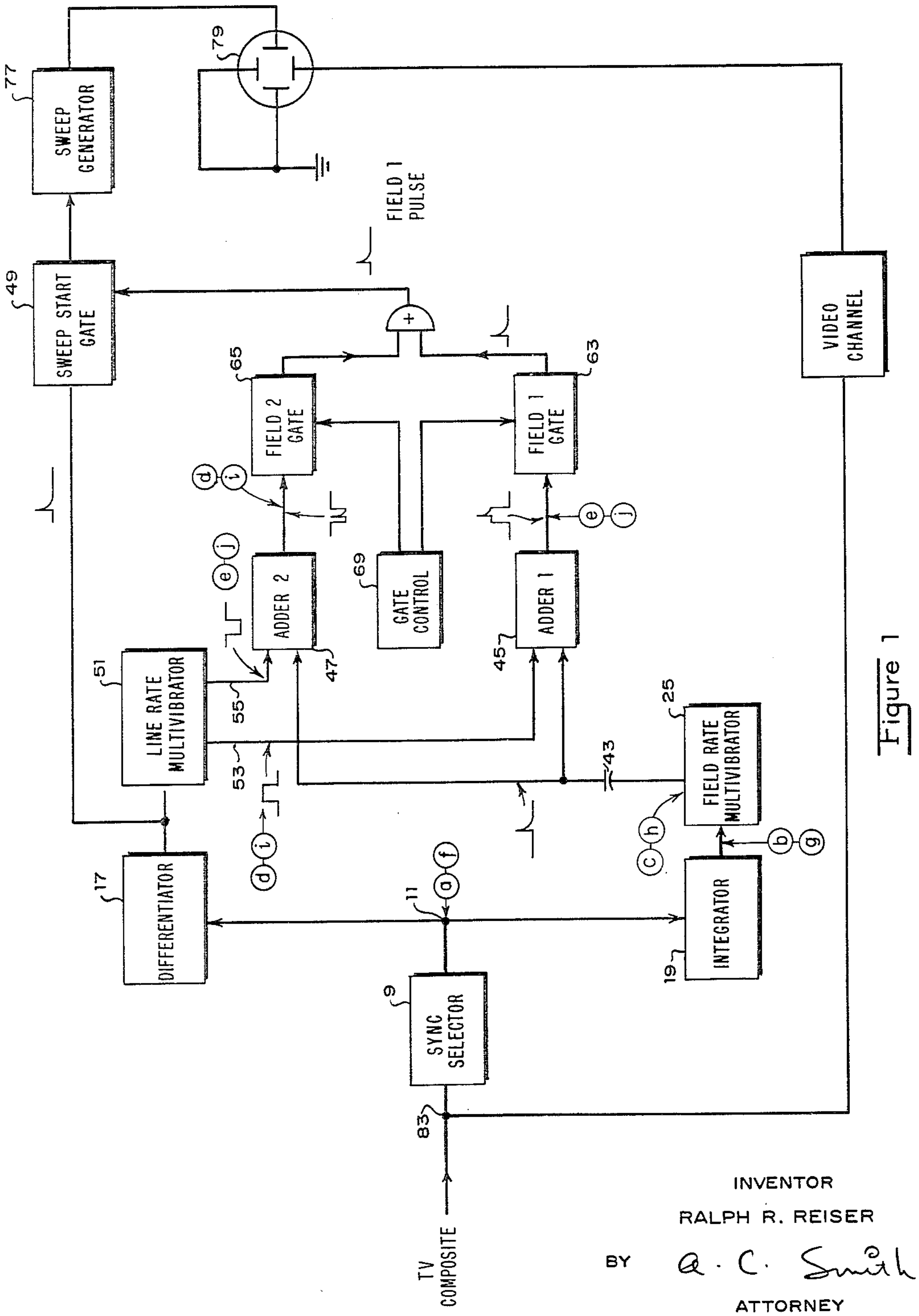
FIGURE 1 is a block schematic diagram of the present circuit.
Figure 2:
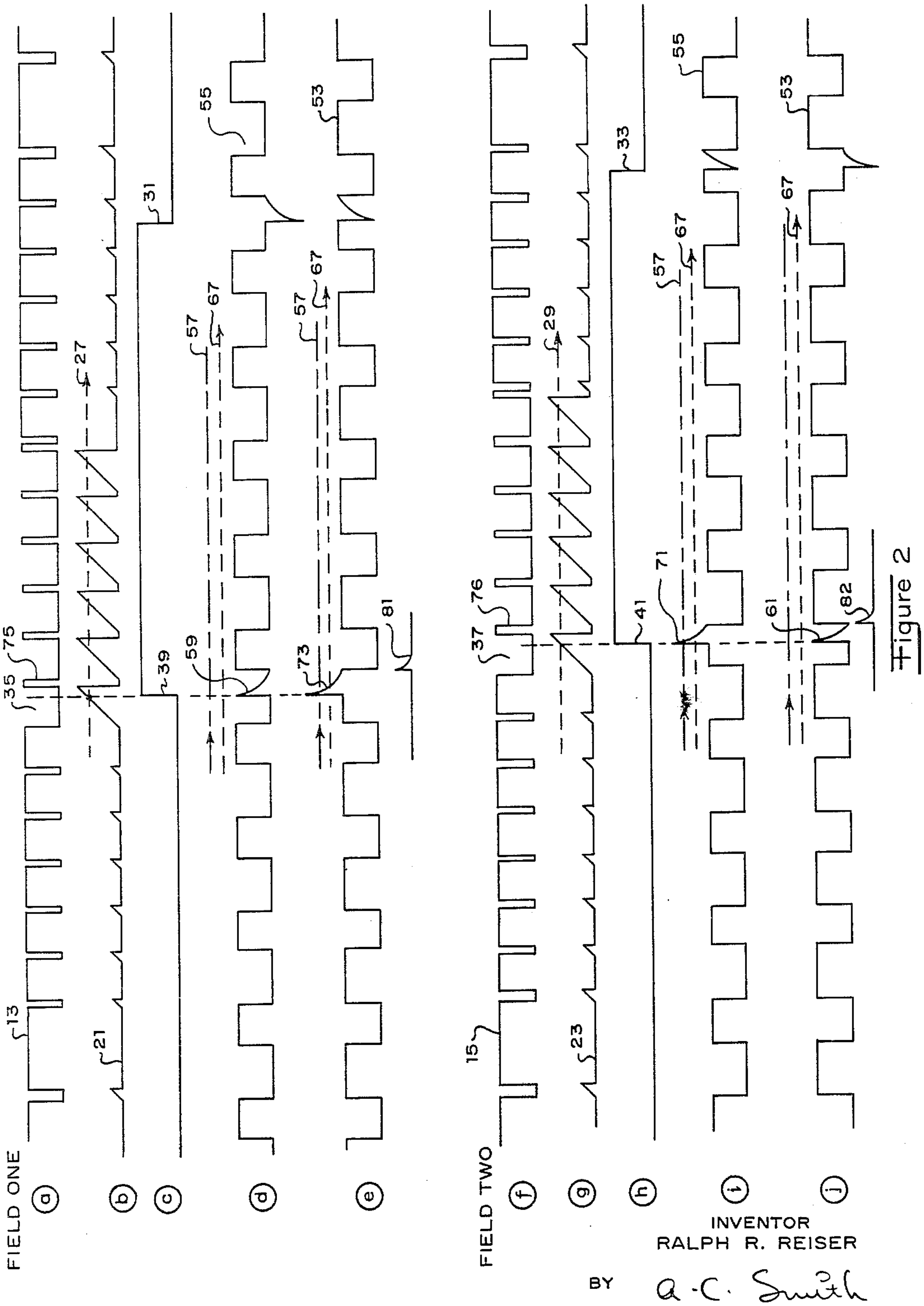
FIGURE 2 is a graph on a common time scale showing various wave forms present in the circuit of FIGURE 1.

Referring now to FIGURE 1, there is shown a synchronizing pulse selector 9 connected to receive the composite TV signal under examination for successively and cyclically producing the two TV field signals 13, 15 of FIGURE 2 on line 11. These field signals 13, 15 are applied to differentiator 17 and to integrator 19. The output 21, 23 of integrator 19 is reset by the trailing edge of each of the synchronizing pulses, as shown in FIGURE 2. The field rate multivibrator 25 connected to the output of integrator 19 is arranged to trigger on a signal applied thereto having a level above the trigger level 27, 29. When triggered multivibrator 25 operates monostably to produce a pulse 31, 33 having a period which is long enough to clear the group of vertical serrated pulses and then recover before the first vertical serrated pulse of the next field. Thus, the duty cycle of the first vertical serrated pulse 35, 37 is sufficient to produce an integrator output capable of triggering the multivibrator 25. This multivibrator is triggered once by the first vertical serrated pulse 35, 37 in each of the field signals occurring in sequence. The leading edge 39, 41 of the pulse 31, 33 from multivibrator 25 is differentiated by a differentiating circuit including capacitor 43 and is applied to the adders 45 and 47.

The negative-going edges of the synchronizing pulses in the pulse train 13, 15 are differentiated by differentiator 17 and are applied to the sweep start gate 49 and to the line rate multivibrator 51. This multivibrator is arranged to have a relaxation time or output pulse period of approximately .55 of the period between horizontal pulses so that its triggering repetition rate is relatively constant through the successive periods of equalizer pulses, vertical serrated pulses and equalizer pulses in each of the two field signals. The output 53 of this multivibrator 51 is combined in adder 45 with the differentiated pulse 31 to identify the field one, and the complementary output 55 of multivibrator 51 is combined in adder 47 with the differentiated pulse 33 to identify the field two. The identification pulse for field one, then, is the multivibrator output 53 and differentiated pulse 31 from multivibrator 25 which combine with the same polarity to exceed the sweep synchronizing trigger level 57 and the identification pulse for field two is the multivibrator output 55 and differentiated pulse 33 which combine with the same polarity to exceed the same trigger level 57. The differentiated pulse 31, 33 which combines in polarity opposition with an output 53, 55 of the multivibrator 51 does not produce a trigger signal, as shown at 59, 61 in FIGURE 2. The field one gate 63 and the field two gate 65 are DC controlled and may include a conventional clamping circuit for convenient selection of field one or field two. Thus, if field one is desired, a DC clamping level 67 may be supplied to gate 65 by DC gate controller 69 to clamp the field two identification pulse 71 at the clamping level 67 below the trigger level 57 and thereby prevent it from interfering with proper sweep triggering. At the same time, the gate controller 69 removes clamping signal from gate 63 so that pulse 73 identifying the selected field one may be applied to sweep start gate 49. This field one identifying pulse 73 opens the start gate 49 and allows the next negative transition 75 in the synchronizing pulse train 13 of field one to produce a sweep start pulse 81. This start pulse 81 then triggers sweep generator 77 to display on the cathode ray tube 79 the field one composite signal appearing at the input 83. Similarly, field two may be selected by clamping only the level of signal in gate 63 to a level below the required trigger level 57. The next negative transition 76 in the synchronizing pulse train may then produce a sweep start pulse 82 for triggering the sweep generator 77 to display the field two composite TV signal.

Figure 3:
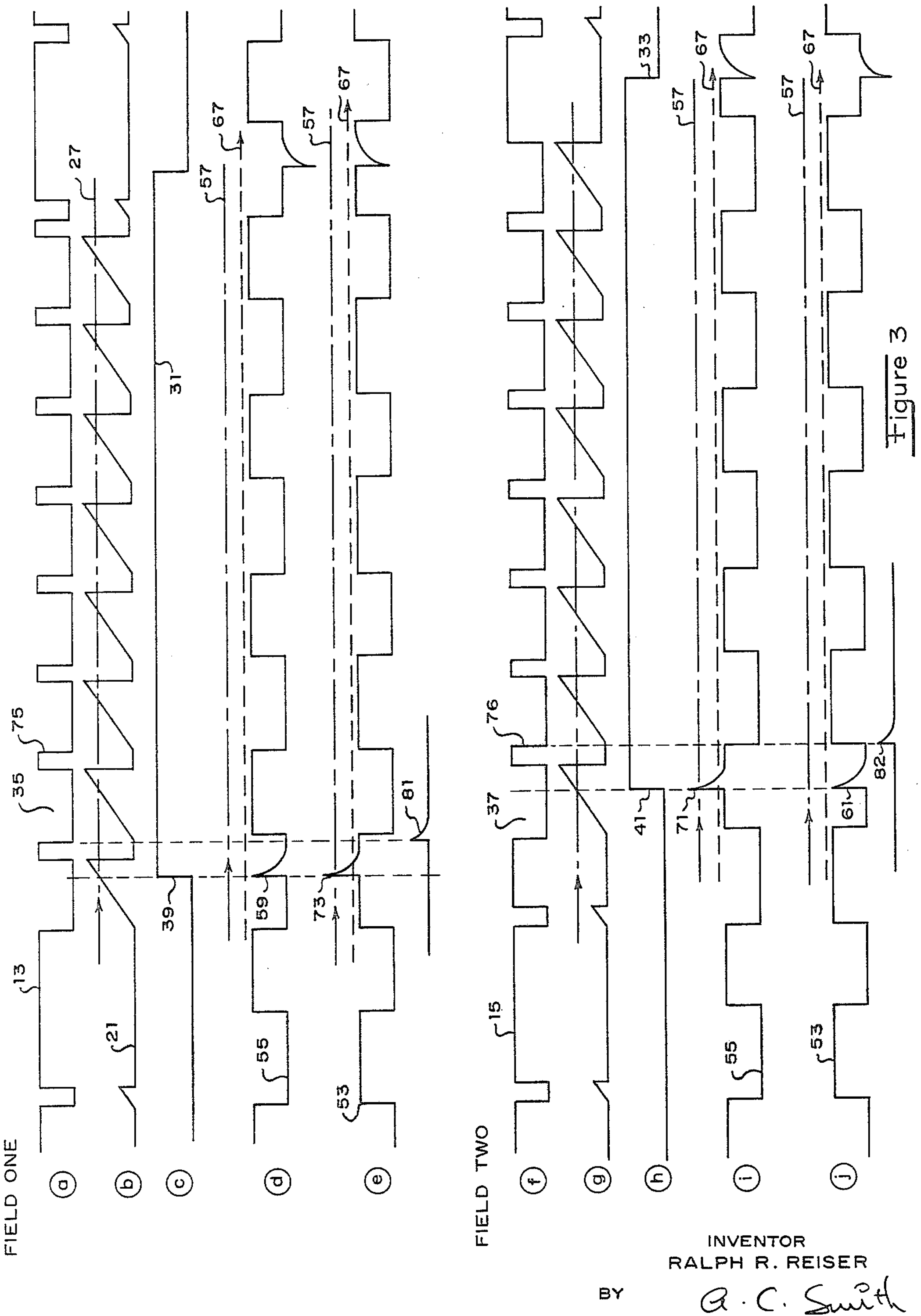
FIGURES 3 and 4 are graphs on common time scales showing typical 405-line and 819-line television system field signals which are selectable by the circuit of FIGURE 1.
Figure 4:
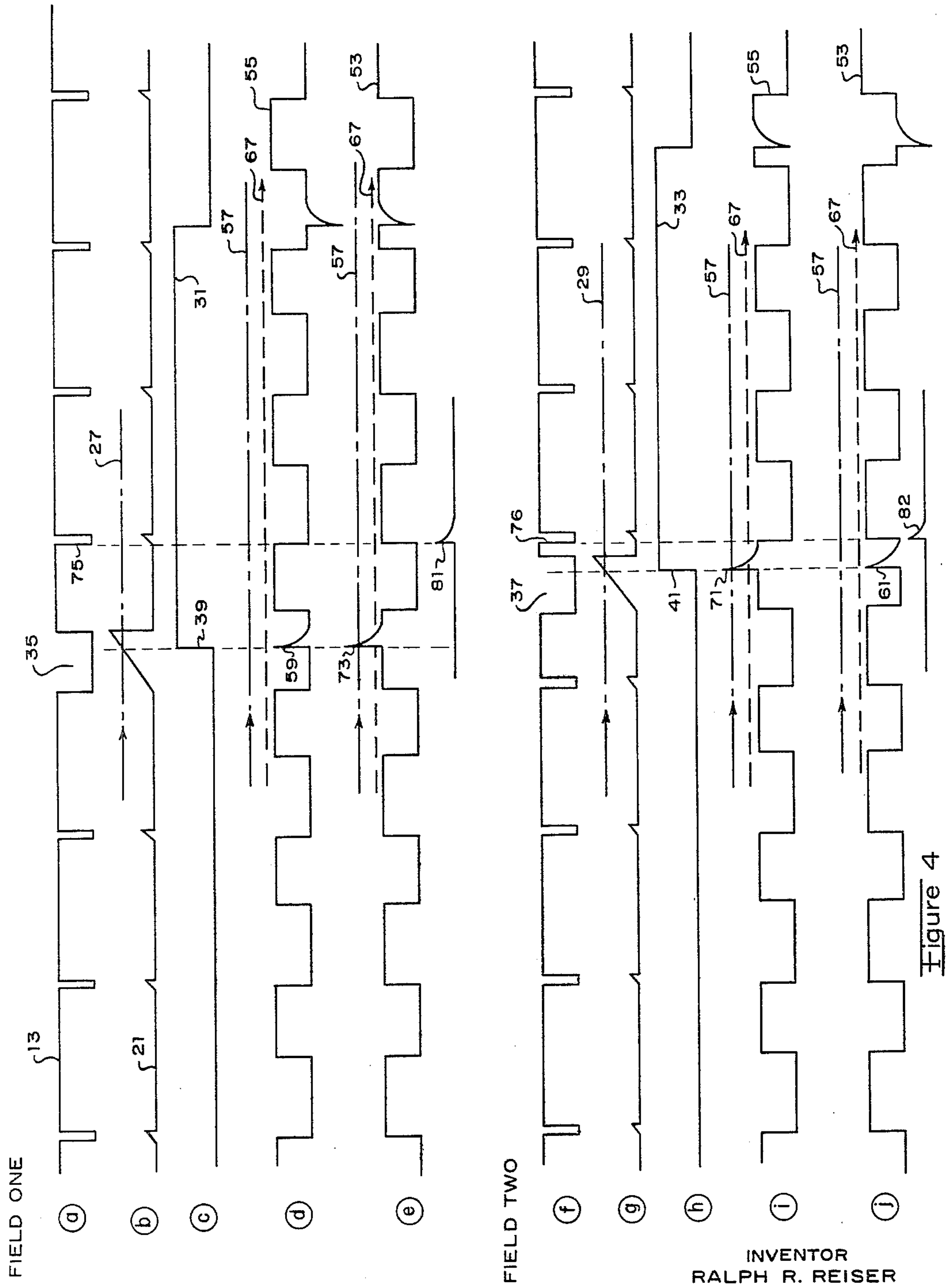

Recovery of the field rate multivibrator 25 at the end of the pulse 31, 33 contributes a negative increment to the signals applied to the adders 45 and 47 and thus does not affect circuit operation. Also, in order to operate the present field select circuit on other commercially used television signal systems, as shown in FIGURES 3 and 4, it is apparent that the field rate multivibrator pulse 31, 33 need only be arranged to recover after the vertical serrated pulses, that the line rate multivibrator 51 be set to provide pulses of about .55 of the period between synchronizing pulses of the television system used and that the integrator 19 run-up time and levels be suitably selected for operation of the circuit on each such system in the manner as previously described.

Thus, the selected field is identified first before the display sweep is initiated in operation of the present circuit on commercial television system signals. Also, the operation of the present circuit is not altered by the number of vertical serrated pulses used or by the absence of equalizer pulses, or the like, in the particular television system under examination.

I claim:

1. Signalling apparatus for displaying a recurrent TV composite signal, the apparatus comprising:
- an integrator;
- means connected to said integrator for applying thereto the horizontal and vertical synchronizing pulses of the TV composite signal, said integrator producing an output at each synchronizing pulse having an amplitude related to the width of such synchronizing pulse;
- a first multivibrator connected to receive the output of said integrator and disposed to change operating states in response to said integrator output attaining a selected level;
- a second multivibrator for producing complementary outputs for each of two operating states;
- circuit means connected to said second multivibrator for changing the operating states thereof on selected transitions of said synchronizing pulses;
- signal selector means connected to receive the complementary outputs of the second multivibrator;
- means connected to the output of said first multivibrator and to said signal selector means for producing at the output thereof a trigger pulse which is indicative of the combination of a signal in the output of said first multivibrator and a selected one of said complementary outputs attaining a selected level;
- a gate connected to receive said trigger pulse for producing an output pulse at a selected transition of the synchronizing pulse appearing after said trigger pulse; and
- a utilization circuit connected to said gate and responsive to said output pulse.

2. Signalling apparatus as in claim 1 wherein:
- said circuit means includes a differentiator for applying the differentiated selected transitions of said synchronizing pulses to said second multivibrator and to said gate for triggering said second multivibrator on selected transitions of said synchronizing pulses and for supplying signal to said gate to produce said output pulse following the appearance of said trigger pulse; and
- said utilization circuit includes signal display means and a sweep signal generator connected to apply a sweep signal to said signal display means in response to said output pulse.

3. Signalling apparatus as in claim 1 wherein:
- said signal selector means includes a circuit for combining one of said complementary outputs and a differentiated selected transition of a synchronizing pulse to produce said trigger pulse in response to said combination attaining a selected level.

References Cited

UNITED STATES PATENTS

| | | | |
|---|---|---|---|
| 2,508,923 | 5/1950 | Mautner | 178—69.5 |
| 2,802,046 | 8/1957 | Keen | 178—69.5 X |
| 3,424,867 | 1/1969 | Monnier | 178—69.5 |

ROBERT L. GRIFFIN, Primary Examiner

R. K. ECKERT, Jr., Assistant Examiner

U.S. Cl. X.R.

315—25